(12) United States Patent
Takahashi et al.

(10) Patent No.: US 11,770,697 B2
(45) Date of Patent: *Sep. 26, 2023

(54) TERMINAL, TRANSMISSION METHOD, AND RADIO COMMUNICATION SYSTEM

(71) Applicant: NTT DOCOMO, INC., Tokyo (JP)

(72) Inventors: Hideaki Takahashi, Tokyo (JP); Hiromasa Umeda, Tokyo (JP); Kei Andou, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/806,418

(22) Filed: Jun. 10, 2022

(65) Prior Publication Data
US 2022/0322075 A1 Oct. 6, 2022

Related U.S. Application Data

(63) Continuation of application No. 16/960,827, filed as application No. PCT/JP2018/044891 on Dec. 6, 2018, now Pat. No. 11,381,959.

(30) Foreign Application Priority Data

Jan. 12, 2018 (JP) .................................. 2018-003712

(51) Int. Cl.
*H04W 8/24* (2009.01)

(52) U.S. Cl.
CPC .................................. *H04W 8/24* (2013.01)

(58) Field of Classification Search
CPC ........ H04L 5/0053; H04L 5/001; H04W 8/24; H04W 16/28
See application file for complete search history.

(56) References Cited

U.S. PATENT DOCUMENTS

| 9,591,490 B2* | 3/2017 | Zhang ..................... H04L 5/001 |
| 10,973,025 B1 | 4/2021 | Zhou et al. |
| 2009/0016411 A1 | 1/2009 | McCallister |

(Continued)

FOREIGN PATENT DOCUMENTS

WO 2017/027057 A1 2/2017

OTHER PUBLICATIONS

International Search Report issued in PCT/JP2018/044891 dated Feb. 19, 2019 (5 pages).

(Continued)

*Primary Examiner* — Congvan Tran
(74) *Attorney, Agent, or Firm* — Osha Bergman Watanabe & Burton LLP

(57) ABSTRACT

A terminal is disclosed that includes a processor that includes, in capability information, a separation class indicating a frequency separation between a lower edge of a component carrier with a lowest frequency for supported intra-band non-contiguous carrier aggregation and an upper edge of a component carrier with a highest frequency for the supported intra-band non-contiguous carrier aggregation. The terminal further includes a transmitter that transmits the capability information to a base station, where the separation class is indicated by an index to identify a class of the frequency separation. In other aspects, a transmission method and a radio communication system are also disclosed.

5 Claims, 12 Drawing Sheets

(56) References Cited

U.S. PATENT DOCUMENTS

| | | | | |
|---|---|---|---|---|
| 2014/0071901 | A1* | 3/2014 | Sundberg | H04L 5/0094 |
| | | | | 370/329 |
| 2014/0133411 | A1 | 5/2014 | Park et al. | |
| 2015/0011233 | A1 | 1/2015 | Kazmi et al. | |
| 2015/0011236 | A1 | 1/2015 | Kazmi et al. | |
| 2017/0179985 | A1 | 6/2017 | Kim et al. | |
| 2017/0187509 | A1* | 6/2017 | Li | H04B 1/26 |
| 2017/0238266 | A1 | 8/2017 | Frank | |
| 2017/0264321 | A1* | 9/2017 | Nomachi | H04B 1/006 |
| 2018/0206113 | A1 | 7/2018 | He et al. | |
| 2020/0322925 | A1 | 10/2020 | Takeda et al. | |

OTHER PUBLICATIONS

Written Opinion of the International Searching Authority issued in PCT/JP2018/044891 dated Feb. 19, 2019 (4 pages).
Qualcomm Incorporated; "UE capability structure of NR and MR-DC"; 3GPP TSG-RAN WG2 Meeting #99bis, R2-1712369; Reno, Nevada, USA; Nov. 27-Dec. 1, 2017 (5 pages).
RAN WG4; "Draft LS on mmWave UE NC CA capability signalling"; 3GPP TSG-RAN WG4 Meeting #84Bis, R4-1711623; Dubrovnik, Croatia; Oct. 9-13, 2017 (1 page).
TSG-RAN WG4; "LS reply on UE RF related parameters, capabilities and features for NR"; 3GPP TSG RAN WG2#AH-1801, R2-1800022; Vancouver, Canada; Jan. 22-26, 2018 (2 pages).
RAN WG4; "LS on mmWave UE NC CA capability signalling"; 3GPP TSG RAN WG2#100, R2-1712137; Reno, Nevada, USA; Nov. 27-Dec. 1, 2017 (1 page).
3GPP TS 36.101 V14.5.0; "3rd Generation Partnership Project; Technical Specification Group Radio Access Network Evolved Universal Terrestrial Radio Access (E-UTRA); User Equipment (UE) radio transmission and reception (Release 14)"; Sep. 2017 (1510 pages).
Office Action issued in the counterpart Japanese Patent Application No. 2019-564341, dated Jun. 15, 2021 (5 pages).
Office Action in counterpart New Zealand Patent Application No. 766601 dated Jul. 15, 2021 (4 pages).
Office Action issued in the counterpart Indian Patent Application No. 202037033409, dated Aug. 17, 2021 (5 pages).
Extended European Search Report issued in counterpart European Patent Application No. 18900549.9, dated Oct. 8, 2021 (8 pages).
Nokia Corporation, Qualcomm Incorporated; "Interband CA framework"; TSG-RAN Working Group 4 (Radio) meeting #58AH, R4-112321; Shanghai, P.R. China; Apr. 11-15, 2011 (59 pages).
Notice of Reasons for Refusal issued in Japanese Application No. 2019-564341 dated Nov. 16, 2021 (3 pages).
Office Action issued in the counterpart Canadian Patent Application No. 3,087,617, dated Aug. 26, 2022 (4 pages).
Office Action issued in the counterpart Chinese Patent Application No. 201880085547.2, dated Jan. 18, 2023 (24 pages).

\* cited by examiner

FIG.4

| NR CA bandwidth class | Aggregated channel bandwidth | Number of CCs | Center Frequency separation between CCs (Fs) |
|---|---|---|---|
| A | CBW ≤ 100 MHz | 1 | N.A |
| C | 100 MHz < CBW ≤ 200 MHz | 2 | CBW (i.e. contiguous) |
| D | 100 MHz < CBW ≤ 200 MHz | 2 | CBW < Fs ≤ 2 CBW |
| E | 100 MHz < CBW ≤ 200 MHz | 2 | 2 CBW < Fs ≤ 4 CBW |
| ... | | ... | ... |

FIG.6

| NR CA bandwidth class | Aggregated channel bandwidth | Number of CCs | Center Frequency separation between CCs (Fs) |
|---|---|---|---|
| A | CBW ≤ 100 MHz | 1 | N.A |
| C | 100 MHz < CBW ≤ 200 MHz | 2 | CBW (i.e. contiguous) |
| D | 100 MHz < CBW ≤ 200 MHz | 2 | CBW < Fs ≤ 2 CBW |
| E | 200 MHz < CBW ≤ 300 MHz | 3 | 2 CBW (i.e. contiguous) |
| F | 200 MHz < CBW ≤ 300 MHz | 3 | 2 CBW < Fs ≤ 4 CBW |
| ... | ... | ... | ... |

FIG.8

| Frequency separation class | Frequency (i.e. center carrier frequency) separation between CCs (Fs) (NOTE) |
|---|---|
| I | CBW < Fs ≤ 2 CBW |
| II | 2 CBW < Fs ≤ 4 CBW |
| III | 4 CBW < Fs ≤ 8 CBW |
| ... | ... |

TERMINAL, TRANSMISSION METHOD, AND RADIO COMMUNICATION SYSTEM

CROSS-REFERENCE TO RELATED APPLICATION

The present application is a continuation application and, thereby, claims benefit under 35 U.S.C. § 120 to U.S. patent application Ser. No. 16/960,827 filed on Jul. 8, 2020, titled "USER EQUIPMENT," which is a national stage application of PCT Application No. PCT/JP2018/044891, filed on Dec. 6, 2018, which claims priority to Japanese Patent Application No. JP2018-003712 filed on Jan. 12, 2018. The contents of the priority applications are incorporated by reference in their entirety.

TECHNICAL FIELD

The present disclosure relates to a terminal, a transmission method, and a radio communication system.

BACKGROUND ART

Currently, in the Third Generation Partnership Project (3GPP), specifications of a new radio communication system, which is called New Radio Access Technology (NR) system, have been developed, as a successor to the Long Term Evolution (LTE) system and the LTE-Advanced system.

In the development of the specifications, a specification of capability information (UE Capability) for the NR system is currently discussed. For the NR system, use of a millimeter wave frequency band higher than the 24 GHz band has been studied, and, in order to use such a millimeter wave frequency band, combinations of component carriers provided with different separations (frequency separations) are assumed to be used for intra-band non-contiguous carrier aggregation (CA).

PRIOR ART DOCUMENT

Non-Patent Document

[Non-Patent Document 1] R2-1800022
[Non-Patent Document 2] R2-1712137
[Non-Patent Document 3] 3GPP TS 36.101 V14.5.0 (2017 September)

SUMMARY OF THE INVENTION

Problem to be Solved by the Invention

When the combinations of the component carriers provided with the different separations can be used for the carrier aggregation, user equipment is required to report, to a base station, which band combinations with corresponding separations are supported for the carrier aggregation, as capability information.

However, as for carrier aggregation band combinations corresponding to such different separations, a scheme for reporting separations as capability information is currently not discussed.

There is a need for a scheme for efficiently reporting, as capability information, separations between component carriers for carrier aggregation supported by user equipment.

Means for Solving the Problem

According to an aspect of the present disclosure, there is provided user equipment including a capability information storage unit that stores capability information of the user equipment; and a capability information transmitting unit that reports the capability information to a base station, wherein the capability information transmitting unit reports, to the base station, a separation between component carriers for carrier aggregation supported by the user equipment, as the capability information.

Advantage of the Invention

According to the present disclosure, the separations between the component carriers for carrier aggregation supported by the user equipment can be efficiently reported, as the capability information.

BRIEF DESCRIPTION OF DRAWINGS

FIG. 4 is a diagram illustrating carrier aggregation bandwidth classes including separations according to an embodiment of the present invention;

FIG. 6 is a diagram illustrating carrier aggregation bandwidth classes including separations according to an embodiment of the present invention;

FIG. 8 is a diagram illustrating separation classes according to an embodiment of the present invention;

EMBODIMENTS OF THE INVENTION

In the following, embodiments of the present invention are described based on the drawings.

In the following embodiments, user equipment supporting carrier aggregation is disclosed. In intra-band non-contiguous CA, an available MIMO layer number may differ depending on a separation between component carriers (CCs). For this reason, similar to LTE, reporting of an available MIMO layer number for each band of a band combination, as capability information, has been discussed in NR. In contrast, in RAN 2, capability information related to the MIMO layer number is not reported for each band of the band combination, and the capability information related to the MIMO layer number, as baseband capability, has been studied to separate from band combination signaling.

Figure 1:
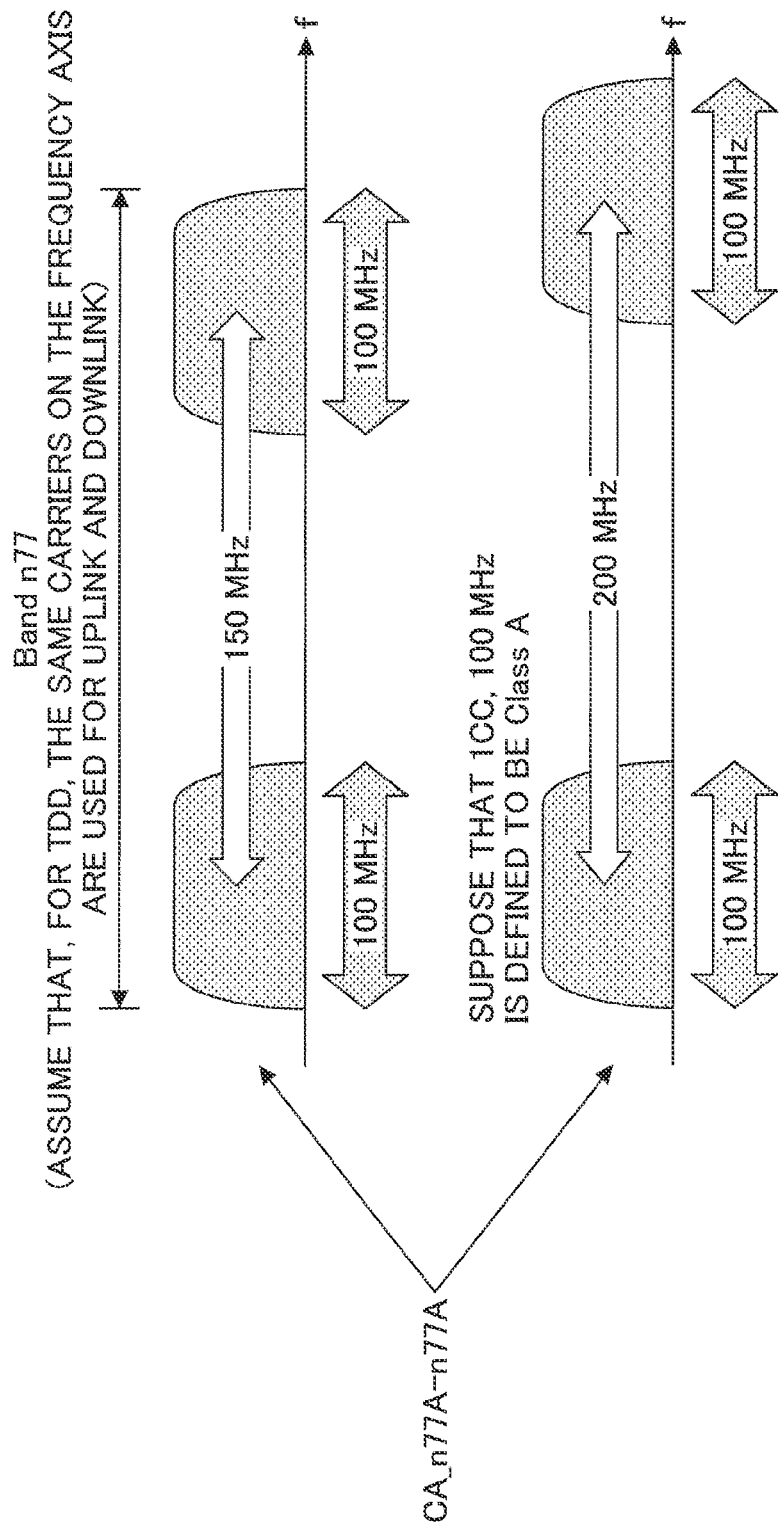
FIG. 1 is a schematic diagram illustrating a specific example of band combinations provided with different separations.

However, in the notation of the band combination specified in the existing LTE, cases in which separations between component carriers of intra-band non-contiguous CA are different may be unable to be appropriately represented, and, as illustrated in FIG. 1, the cases may be denoted as identical band combinations (e.g., CA_n77A-n77A). Accordingly, when a MIMO layer number differs depending on a separation between component carriers, for each band combination, a separation between component carriers and a MIMO layer number for each band are required to be reported as capability information, and, thus, a signaling size may increase. Accordingly, there is a need for a capability information signaling method for efficiently reporting a separation between component carriers and a MIMO layer number.

According to the present disclosure, user equipment reports, to a base station, a separation between component carriers for carrier aggregation supported by the user equipment, as capability information. According to an embodiment, user equipment reports, to a base station, a combination of component carriers (a band combination) for carrier aggregation supported by the user equipment and a carrier aggregation bandwidth class indicating a separation between the component carriers, as capability information. Alternatively, in another embodiment, user equipment reports, to a base station, a combination of component carriers (a band combination) for carrier aggregation supported by the user equipment and a separation class indicating a separation between the component carriers for the carrier aggregation supported by the user equipment, as capability information. Upon receiving the capability information, the base station can detect the combination of the component carriers for the carrier aggregation supported by the user equipment and the separation between the component carriers.

Figure 2:
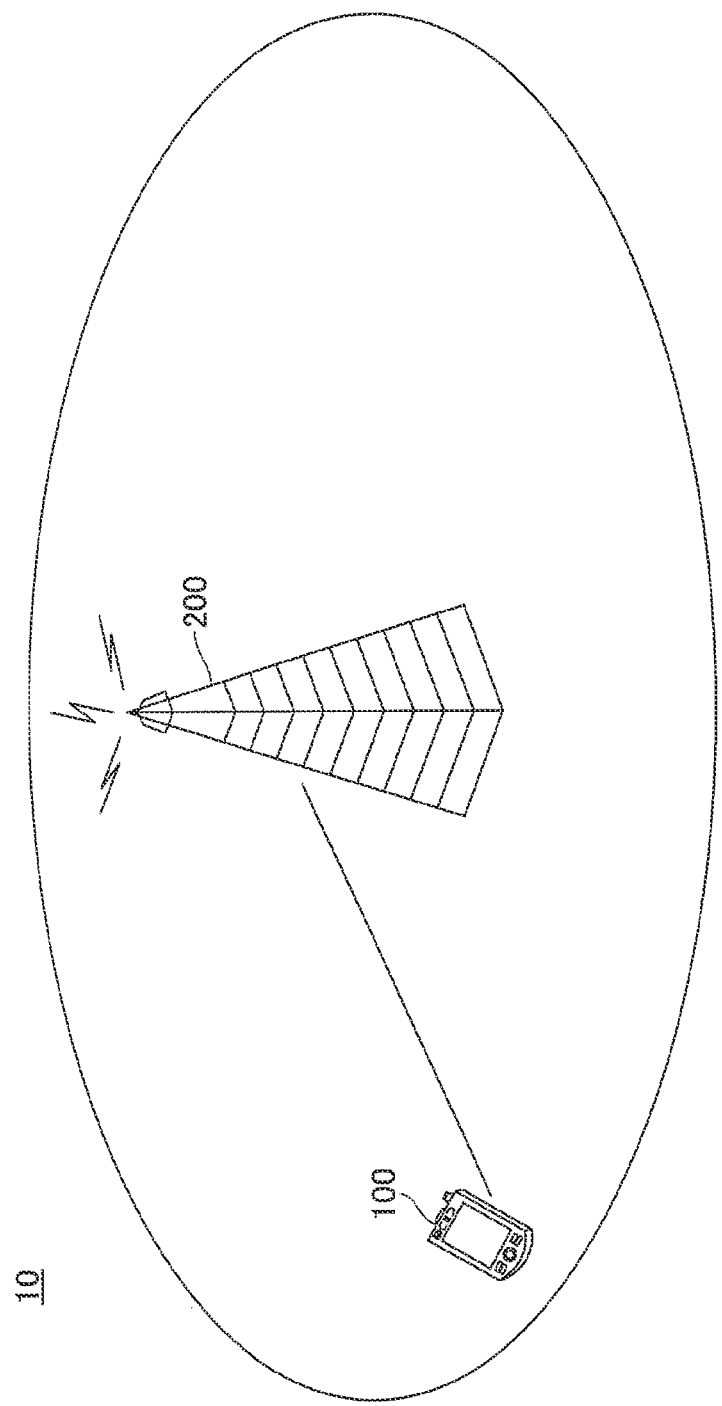
FIG. 2 is a schematic diagram illustrating a radio communication system according to an embodiment of the present invention.

First, a radio communication system according to an embodiment of the present invention is described by referring to FIG. 2. FIG. 2 is a schematic diagram illustrating a radio communication system according to the embodiment of the present invention.

As illustrated in FIG. 2, a radio communication system 10 includes user equipment 100 and a base station 200. Typically, the radio communication system 10 is an NR system. However, the radio communication system 10 is not limited to this, and the radio communication system 10 may be any 3GPP compliant radio communication system specified by 3GPP, or may be a non-3GPP compliant radio communication system.

The user equipment 100 is an information processing device including a function for radio communication with the base station 200 through a cell. For example, without limiting, the user equipment 100 may be a mobile phone, a smartphone, a tablet, a wearable device, etc.

The base station 200 executes radio communication with multiple units of user equipment including the user equipment 100, under control by a higher layer station (not depicted), such as a core network. In an NR system, the base station 200 may be referred to as a gNB, for example. In the depicted embodiment, only one base station 200 is illustrated. Typically, multiple base stations are deployed to cover a coverage range of the radio communication system 10.

Figure 3:
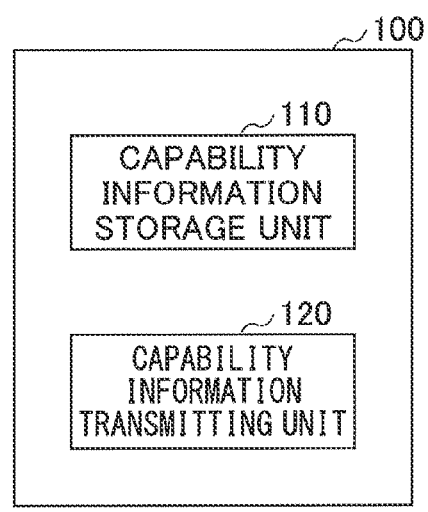
FIG. 3 is a block diagram illustrating a functional configuration of user equipment according to an embodiment of the present invention.

Next, user equipment according to an embodiment of the present invention is described by referring to FIG. 3. FIG. 3 is a block diagram illustrating a functional configuration of the user equipment according to the embodiment of the present invention.

As illustrated in FIG. 3, the user equipment 100 is provided with a capability information storage unit 110 and a capability information transmitting unit 120.

The capability information storage unit 110 stores capability information of the user equipment 100. Specifically, the capability information storage unit 110 maintains capability information (UE Capability) representing various types of capability and functions supported by the user equipment 100. For example, when the user equipment 100 supports carrier aggregation, the capability information storage unit 110 maintains capability information including an information element representing that the user equipment 100 supports carrier aggregation and an information element representing details of a band combination with which the carrier aggregation can be executed.

The capability information transmitting unit 120 reports capability information to the base station 200. Specifically, upon receiving a capability information query message from the base station 200, the capability information transmitting unit 120 transmits capability information stored in the capability information storage unit 110 to the base station 200. In the embodiment, the capability information transmitting unit 120 reports, to the base station 200, a separation between component carriers for carrier aggregation supported by the user equipment 100, as the capability information. Specifically, as described in detail below, the capability information storage unit 110 maintains capability information including an information element representing a frequency separation (frequency separation) between at least two component carriers for intra-band non-contiguous CA supported by the user equipment 100, and, in response to receiving a capability information query message from the base station 200, the capability information transmitting unit 120 transmits the capability information including the information element to the base station 200.

In an embodiment, the capability information storage unit 110 may store a combination of component carriers for carrier aggregation supported by the user equipment 100 and a carrier aggregation bandwidth class representing a separation between the component carriers supported by the user equipment 100. At this time, the capability information transmitting unit 120 may report, to the base station 200, the combination of the component carriers for the carrier aggregation supported by the user equipment 100 and the carrier aggregation bandwidth class, as the capability information.

As an example, for intra-band non-contiguous CA up to 2 CCs, carrier aggregation bandwidth classes, such as those shown in FIG. 4, may be defined. For example, if the user equipment 100 supports the carrier aggregation bandwidth class A, as depicted, the user equipment 100 is capable of executing radio communication such that a number of component carriers is 1 and an aggregated channel bandwidth (CBW) is 100 MHz. Similarly, if the user equipment 100 supports the carrier aggregation bandwidth class C, as depicted, the user equipment 100 supports carrier aggregation such that a number of component carriers is 2, an aggregated channel bandwidth (CBW) is from 100 MHz to 200 MHz, and a separation between center frequencies of component carriers (Fs) is the channel bandwidth (i.e., two component carriers are contiguous). Similarly, if the user equipment 100 supports the carrier aggregation bandwidth class D, as depicted, the user equipment 100 supports carrier aggregation such that a number of component carriers is 2, an aggregated channel bandwidth (CBW) is from 100 MHz to 200 MHz, and a separation between center frequencies of component carriers (Fs) satisfies CBW<Fs≤2CBW. Similarly, if the user equipment 100 supports the carrier aggregation bandwidth class E, as depicted, the user equipment 100 supports carrier aggregation such that a number of component carriers is 2, an aggregated channel bandwidth (CBW) is from 100 MHz to 200 MHz, and a separation between center frequencies of component carriers (Fs) satisfies 2CBW<Fs≤4CBW.

Figure 5A:
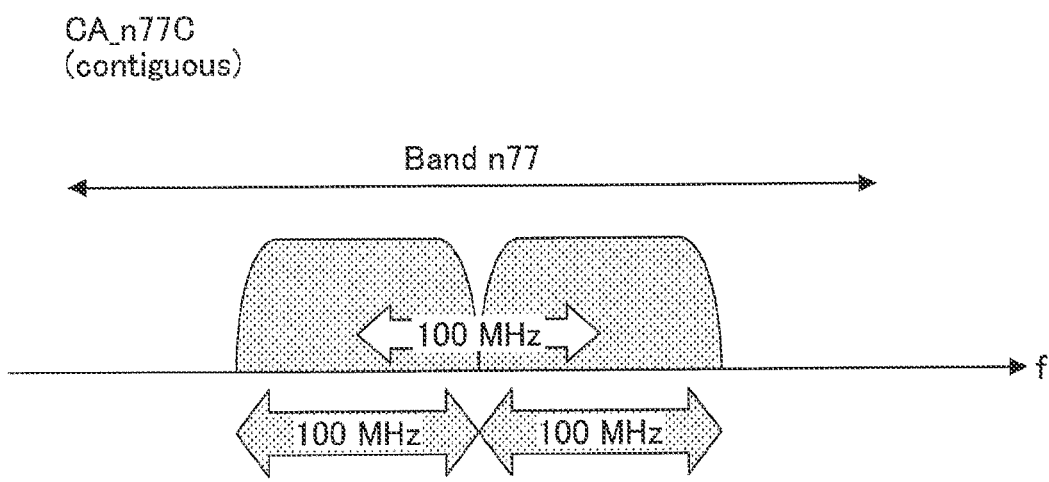
FIG. 5A is a schematic diagram illustrating a specific example of a carrier aggregation bandwidth class according to an embodiment of the present invention.

The capability information storage unit 110 may maintain a carrier aggregation bandwidth class supported by the user equipment 100, among the carrier aggregation bandwidth classes defined as described above, and the capability information transmitting unit 120 may report, to the base station 200, the carrier aggregation bandwidth class maintained in the capability information storage unit 110, as the capability information. For example, as shown in FIG. 5A, if the user equipment 100 supports the carrier aggregation bandwidth class C in Band n77, the capability information transmitting unit 120 may report, to the base station 200, a combination of component carriers for carrier aggregation supported by the user equipment 100 and the carrier aggregation bandwidth class CA_n77C representing a separation between the component carriers, as the capability information.

Figure 5B:
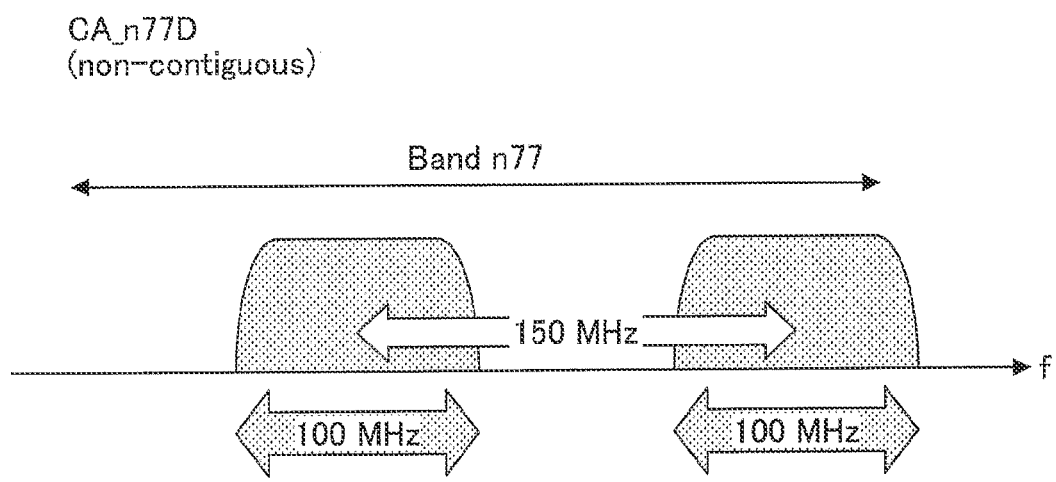
FIG. 5B is a schematic diagram illustrating a specific example of a carrier aggregation bandwidth class according to an embodiment of the present invention.

Similarly, as shown in FIG. 5B, if the user equipment 100 supports the carrier aggregation bandwidth class D in Band n77, the capability information transmitting unit 120 may report, to the base station 200, a combination of component carriers for carrier aggregation supported by the user equipment 100 and the carrier aggregation bandwidth class CA_n77D representing a separation between the component carriers, as the capability information. Upon receiving the capability information, the base station 200 can recognize, based on the received capability information, that the user equipment 100 supports the carrier aggregation with the separation, such as the depicted separations.

Additionally, as shown in FIG. 6, the above-described embodiment can be applied to three or more CCs. For example, if the user equipment 100 supports the carrier aggregation bandwidth class E, as depicted, the user equipment 100 supports carrier aggregation such that a number of component carriers is 3, an aggregated channel bandwidth (CBW) is from 200 MHz to 300 MHz, and a separation between center frequencies of component carriers (Fs) is 2CBW (i.e., three component carriers are contiguous). Similarly, if the user equipment 100 supports the carrier aggregation bandwidth class F, as depicted, the user equipment 100 supports carrier aggregation such that a number of component carriers is 3, an aggregated channel bandwidth (CBW) is from 200 MHz to 300 MHz, and a separation between center frequencies of component carriers (Fs) satisfies 2CBW<Fs≤4CBW.

Figure 7A:
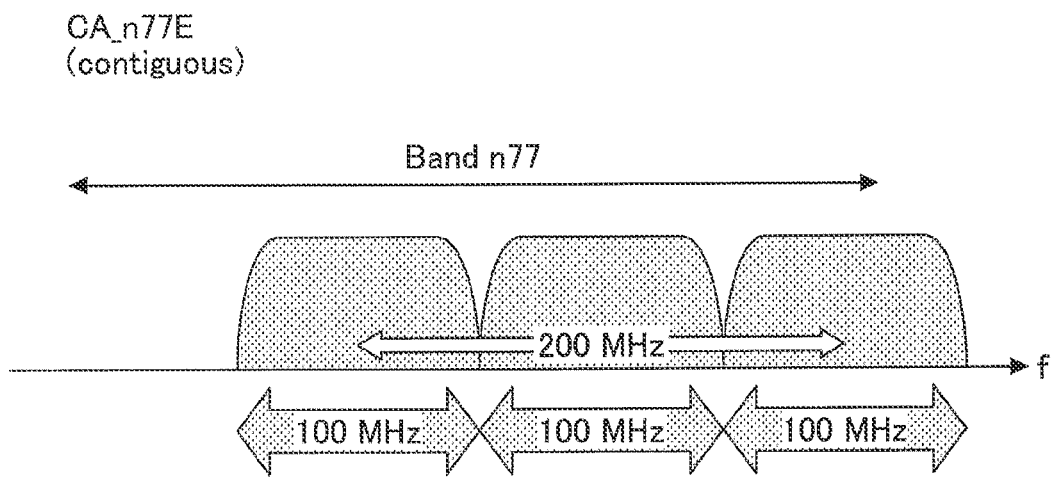
FIG. 7A is a schematic diagram illustrating a specific example of a carrier aggregation bandwidth class according to an embodiment of the present invention.
Figure 7B:
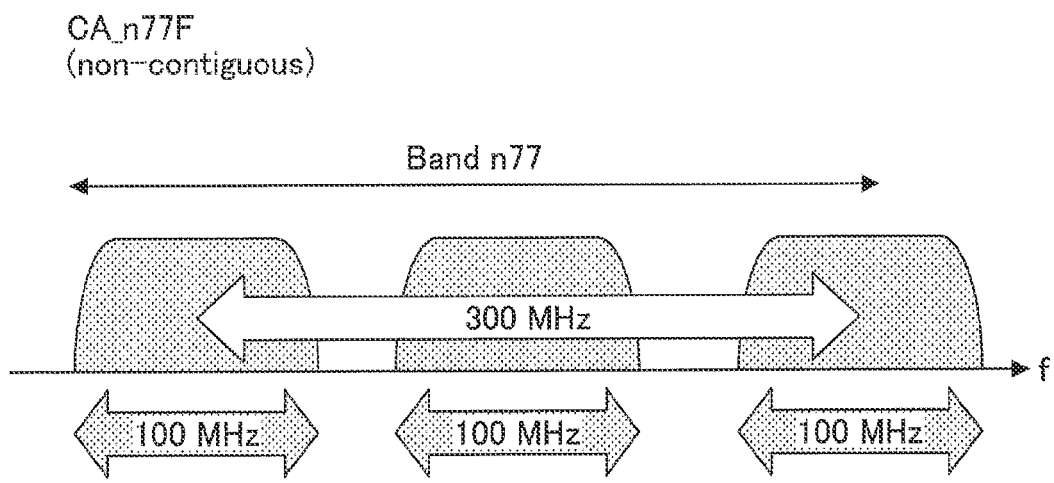
FIG. 7B is a schematic diagram illustrating a specific example of a carrier aggregation bandwidth class according to an embodiment of the present invention.

The capability information storage unit 110 may maintain a carrier aggregation bandwidth class supported by the user equipment 100, among the carrier aggregation bandwidth classes defined as described above, and the capability information transmitting unit 120 may report, to the base station 200, the carrier aggregation bandwidth class maintained in the capability information storage unit 110, as the capability information. For example, as shown in FIG. 7A, if the user equipment 100 supports the carrier aggregation bandwidth class E in Band n77, the capability information transmitting unit 120 may report, to the base station 200, a combination of component carriers for carrier aggregation supported by the user equipment 100 and the carrier aggregation bandwidth class CA_n77E representing a separation between the component carriers, as the capability information. Similarly, as shown in FIG. 7B, if the user equipment 100 supports the carrier aggregation bandwidth class F in Band n77, the capability information transmitting unit 120 may report, to the base station 200, a combination of component carriers for carrier aggregation supported by the user equipment 100 and the carrier aggregation bandwidth class CA_n77F representing a separation between the component carriers, as the capability information. Upon receiving the capability information, the base station 200 can recognize, based on the received capability information, that the user equipment 100 supports the carrier aggregation with the separation, such as the depicted separation.

Here, a carrier aggregation bandwidth class may be associated with a MIMO layer number. Specifically, a MIMO layer number that can be supported by the user equipment 100 may be indicated by a BPC (Baseband Processing Combination) index representing a function related to a baseband of the user equipment 100, and a carrier aggregation bandwidth class supported by the user equipment 100 may be associated with the BPC index. For example, if the user equipment 100 supports the carrier aggregation bandwidth class C and a MIMO layer number X corresponding to a BPC index #1 in Band n77, the capability information transmitting unit 120 may report, to the base station 200, the above-described CA_n77C and the associated BPC index #1, as the capability information. Similarly, if the user equipment 100 supports the carrier aggregation bandwidth class F and a MIMO layer number Y corresponding to a BPC index #2 in Band n77, the capability information transmitting unit 120 may report, to the base station 200, the above-described CA_n77F and the associated BPC index #2, as the capability information.

Additionally, in another embodiment, the capability information storage unit 110 may store a separation class representing a separation between component carriers for carrier aggregation supported by the user equipment 100. At this time, the capability information transmitting unit 120 may report, to the base station 200, a combination of the component carriers for the carrier aggregation supported by the user equipment 100 and the separation class supported by the user equipment 100, as the capability information.

As an example, for intra-band non-contiguous CA up to 2 CCs, separation classes, such as those shown in FIG. 8, may be defined. For example, if the user equipment 100 supports a separation class I, as depicted, the user equipment 100 supports carrier aggregation such that a separation between center frequencies of component carriers (Fs) satisfies CBW<Fs≤2CBW. Similarly, if the user equipment 100 supports a separation class II, as depicted, the user equipment 100 supports carrier aggregation such that a separation between center frequencies of component carriers (Fs) satisfies 2CBW<Fs≤4CBW. Similarly, if the user equipment 100 supports a separation class III, as depicted, the user equipment 100 supports carrier aggregation such that a separation between center frequencies of component carriers (Fs) satisfies 4CBW<Fs≤8CBW.

Figure 9A:
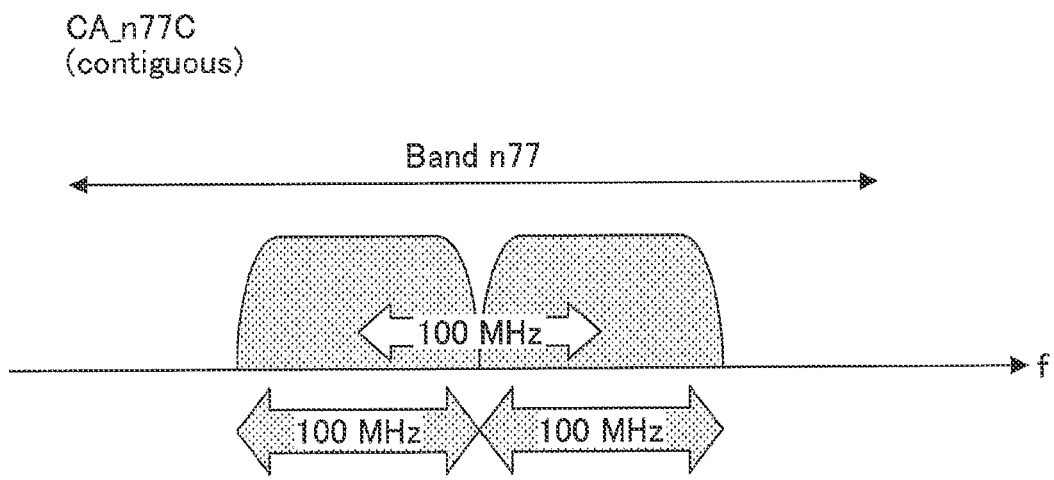
FIG. 9A is a schematic diagram illustrating a specific example of a separation class according to an embodiment of the present invention.
Figure 9B:
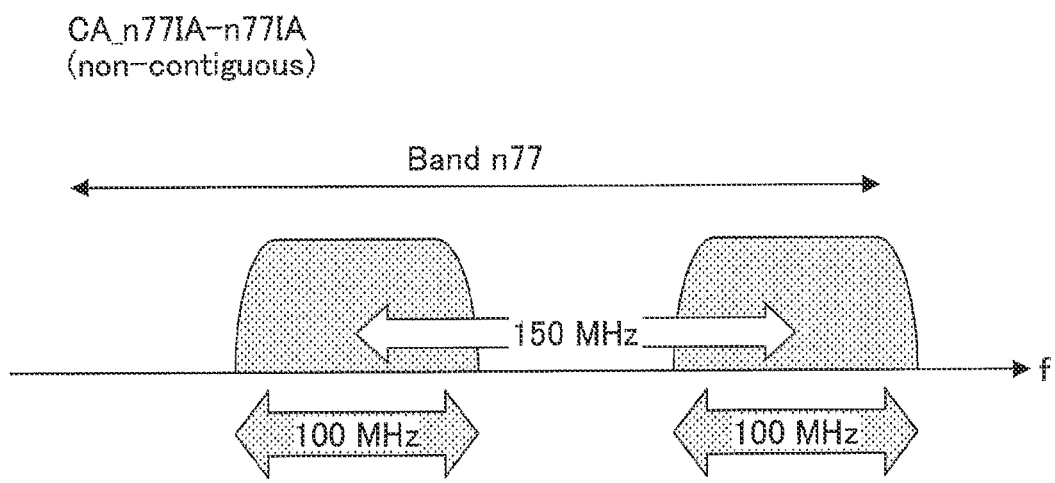
FIG. 9B is a schematic diagram illustrating a specific example of a separation class according to an embodiment of the present invention.

The capability information storage unit 110 may maintain a separation class supported by the user equipment 100, among the separation classes defined as described above, and the capability information transmitting unit 120 may report, to the base station 200, the separation class maintained in the capability information storage unit 110, as the capability information. For example, as shown in FIG. 9A, if the user equipment 100 supports a band combination CA_n77 with two contiguous component carriers in Band n77, the capability information transmitting unit 120 may report CA_n77C to the base station 200, without reporting the separation class. Whereas, as shown in FIG. 9B, if the user equipment 100 supports the band combination CA_n77 with two non-contiguous component carriers and the separation class I in Band n77, the capability information transmitting unit 120 may report, as the capability information, CA_n77IA-n77IA to the base station 200. Upon receiving the capability information, the base station 200 can recognize, based on the received capability information, that the user equipment 100 supports the carrier aggregation with the separation, such as the depicted separation.

Figure 10A:
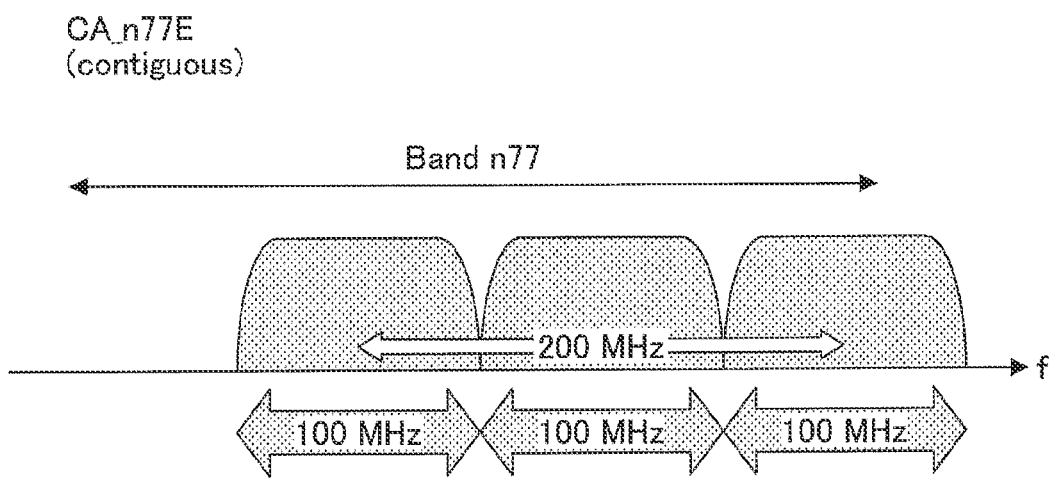
FIG. 10A is a schematic diagram illustrating a specific example of a separation class according to an embodiment of the present invention.
Figure 10B:
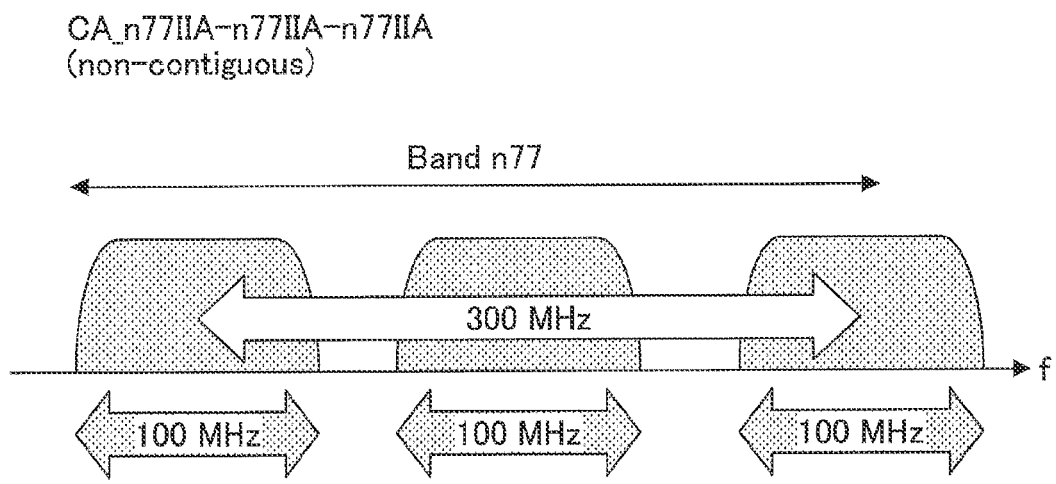
FIG. 10B is a schematic diagram illustrating a specific example of a separation class according to an embodiment of the present invention.

The above-described embodiment can be applied to three or more CCs. For example, as shown in FIG. 10A, if the user equipment 100 supports a band combination CA_n77 with three contiguous component carriers in Band n77, the capability information transmitting unit 120 reports CA_n77E to the base station 200 without reporting a separation class. Whereas, as shown in FIG. 10B, if the user equipment 100 supports the band combination CA_n77 with three non-contiguous component carriers and the separation class II in Band n77, the capability information transmitting unit 120 may report, as the capability information, CA_n77IIA-n77IIA-n77IIA to the base station 200. Upon receiving the capability information, the base station 200 can recognize, based on the received capability information, that the user equipment 100 supports the carrier aggregation based on the band combination with the separation, such as the depicted separation.

Here, a separation class may be associated with a MIMO layer number. Specifically, a separation class supported by the user equipment 100 may be associated with a BPC index. For example, if the user equipment 100 supports the separation class I and a MIMO layer number X corresponding to a BPC index #1 in Band n77, the capability information transmitting unit 120 may report, to the base station 200, the above-described CA_n77IA-n77IA and the associated BPC index #1, as the capability information.

Additionally, in an embodiment, a separation between component carriers for carrier aggregation may take a same value or different values for downlink communication and uplink communication. For example, if the user equipment 100 supports a band combination with a same separation for both downlink CA and uplink CA, the capability information transmitting unit 120 may report, as the capability information, the separation that takes the same value to the base station 200. Whereas, if the user equipment 100 supports a band combination with different separations for downlink CA and uplink CA, the capability information transmitting unit 120 may report, to the base station 200, the separation for the downlink CA and the separation for the uplink CA, as the capability information.

Figure 11:
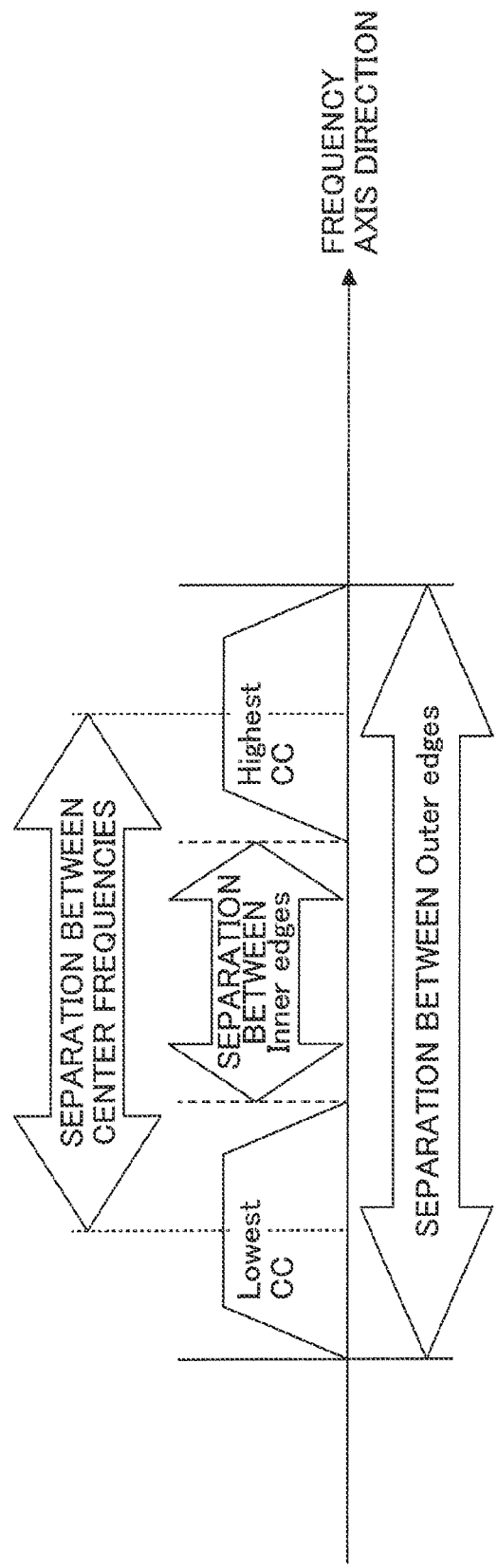
FIG. 11 is a schematic diagram illustrating separations according to various embodiments of the present invention.

In the above-described embodiments, the separation is defined to be a frequency separation between center frequencies of a component carrier in a highest frequency band and a component carrier in a lowest frequency band. However, in another embodiment, as illustrated in FIG. 11, a separation may be defined to be a frequency separation between inner edges of a component carrier in a highest frequency band and a component carrier in a lowest frequency band, or a frequency separation between outer edges of a component carrier in a highest frequency band and a component carrier in a lowest frequency band.

Figure 12:
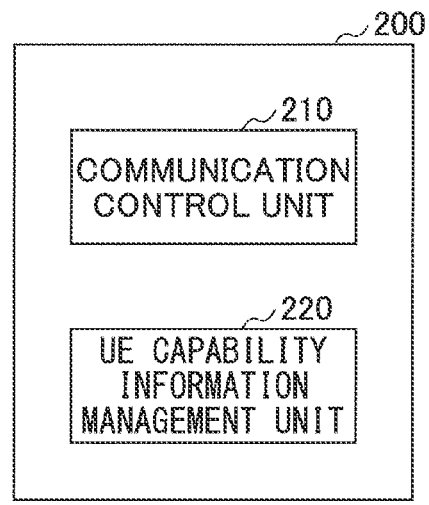
FIG. 12 is a block diagram illustrating a functional configuration of a base station according to an embodiment of the present invention.

Next, by referring to FIG. 12, a base station according to an embodiment of the present invention is described. FIG. 12 is a block diagram illustrating a functional configuration of the base station according to the embodiment of the present invention.

As illustrated in FIG. 12, the base station 200 includes a communication control unit 210 and a UE capability information management unit 220.

The communication control unit 210 controls radio communication with the user equipment 100. Specifically, in order to execute radio communication with the user equipment 100, the communication control unit 210 transmits and receives various types of radio signals, such as downlink control/data signals and/or uplink control/data signals.

The UE capability information management unit 220 maintains capability information received from the user equipment 100. Specifically, the UE capability information management unit 220 transmits a capability information query message to the user equipment 100, and the UE capability information management unit 220 receives capability information from the user equipment 100 in response to the capability information query message.

In the embodiments, as described above, the user equipment 100 transmits, to the base station 200, capability information including a separation between component carriers for carrier aggregation supported by the user equipment 100. Upon receiving the capability information, the communication control unit 210 can detect, based on the received capability information, a band combination for the carrier aggregation supported by the user equipment 100 and the separation between the component carriers, and the communication control unit 210 can configure the carrier aggregation on the user equipment 100 based on the arrangement of the component carriers in the band combination supported by the user equipment 100.

Conclusion of the Embodiments

As described above, according to the embodiments, there is provided user equipment including a capability information storage unit that stores capability information of the user equipment; and a capability information transmitting unit that reports the capability information to a base station, wherein the capability information transmitting unit reports, to the base station, a separation between component carriers for carrier aggregation supported by the user equipment, as the capability information. According to the user equipment, the separation between the component carriers for the carrier aggregation supported by the user equipment can be efficiently reported as the capability information.

The capability information storage unit may store a combination of the component carriers for the carrier aggregation supported by the user equipment and a carrier aggregation bandwidth class supported by the user equipment, the carrier aggregation bandwidth class representing the separation between the component carriers, and the capability information transmitting unit may report, to the base station, the carrier aggregation bandwidth class supported by the user equipment, as the capability information.

The carrier aggregation bandwidth class may be associated with a MIMO layer number.

The capability information storage unit may store a separation class representing the separation between the component carriers for the carrier aggregation supported by the user equipment, and the capability information transmitting unit may report, to the base station, a combination of the component carriers of the carrier aggregation supported by the user equipment and the separation class supported by the user equipment, as the capability information.

The separation class may be associated with a MIMO layer number.

The separation between the component carriers of the carrier aggregation may take identical values or different values for downlink communication and uplink communication.

The separation may be a frequency separation between center frequencies of a component carrier in a highest frequency band and a component carrier in a lowest frequency band; a frequency separation between inner edges of the component carrier in the highest frequency band and the component carrier in the lowest frequency band; or a frequency separation between outer edges of the component carrier in the highest frequency band and the component carrier in the lowest frequency band.

User equipment includes a controller that includes, in capability information, a frequency separation between a lower edge of a component carrier with a lowest frequency for supported carrier aggregation and an upper edge of a component carrier with a highest frequency for the supported carrier aggregation; and a transmitter that transmits the capability information to a base station.

The controller may include a combination of the component carriers for the carrier aggregation in the capability information.

The capability information may be associated with a MIMO layer number.

The transmitter may include a separation class representing the separation between the component carriers for the supported carrier aggregation and a combination of the component carriers for the supported carrier aggregation in the capability information, and may transmit the separation class and the combination to the base station.

The separation class may be associated with the MIMO layer number.

The separation between the component carriers of the carrier aggregation may take identical values or different values for downlink communication and uplink communication.

The separation may be a frequency separation between center frequencies of the component carrier in the highest frequency band and the component carrier in the lowest frequency band; a frequency separation between inner edges of the component carrier in the highest frequency band and the component carrier in the lowest frequency band; or a frequency separation between outer edges of the component carrier in the highest frequency band and the component carrier in the lowest frequency band.

A transmission method by user equipment includes a step of including, in capability information, a frequency separation between a lower edge of a component carrier with a lowest frequency for supported carrier aggregation and an upper edge of a component carrier with a highest frequency for the supported carrier aggregation; and a step of transmitting the capability information to a base station.

Supplemental Embodiment

The block diagrams used for the descriptions of the above-described embodiments represent blocks on a function-by-function basis. These functional blocks (components) are implemented by any combination of at least one of hardware and software. Here, a means for implementing each functional block is not particularly limited. Namely, each functional block may be implemented by one device that is physically or logically combined, or may be implemented by a plurality of devices that is obtained by directly or indirectly (e.g., using a wired line or a wireless link) connecting two or more devices that are physically or logically separated. A functional block may be implemented by combining software with the above-described one device or the above-described plurality of devices.

The functions include determination, decision, judgment, calculation, computation, processing, derivation, investigation, search, confirmation, reception, transmission, output, access, resolution, selection, choice, establishment, comparison, assumption, expectation, deeming, broadcasting, notifying, communicating, forwarding, configuring, reconfiguring, allocating, mapping, assigning, etc. However, the functions are not limited to these. For example, a functional block (component) for transmitting is referred to as a transmitting unit or a transmitter. As described above, a method for implement any one of these is not particularly limited.

Figure 13:
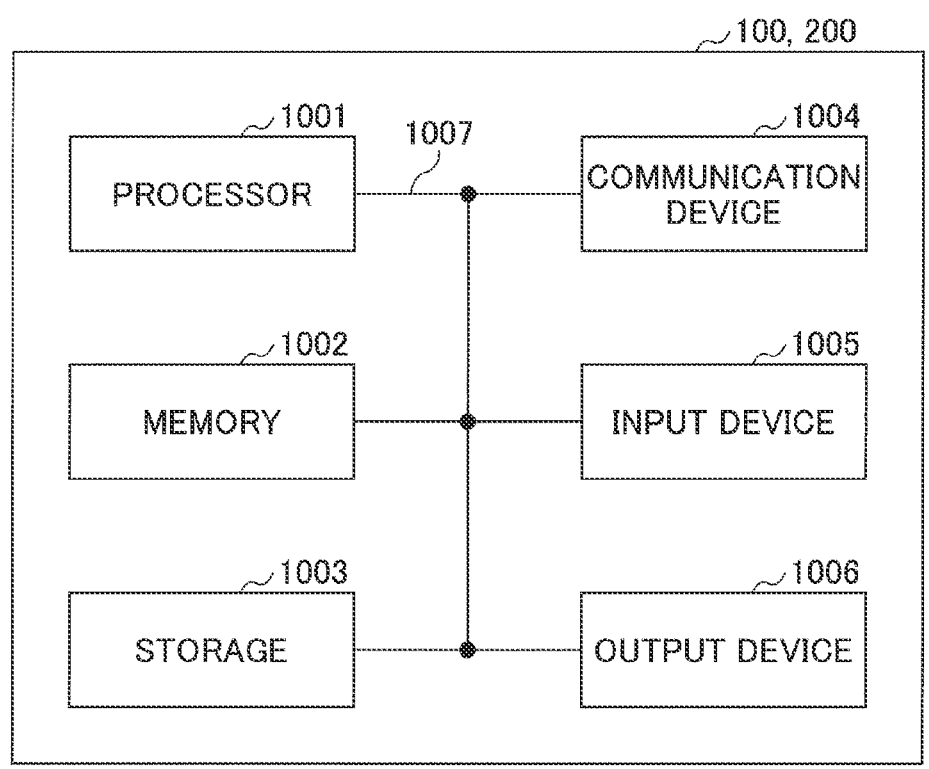
FIG. 13 is a schematic diagram illustrating a specific example of a hardware configuration of each of the user equipment and the base station according to an embodiment of the present invention.

For example, the user equipment 100 and the base station 200 according to the embodiment of the present invention may function as computers for executing a process of the radio communication method of the present invention. FIG. 13 is a block diagram illustrating a hardware configuration of each of the base user equipment 100 and the base station 200 according to an embodiment of the present invention. Each of the above-described user equipment 100 and base station 200 may be physically configured as a computer device including a processor 1001, a memory 1002, a storage 1003, a communication device 1004, an input device 500, an output device 1006, a bus 1007, etc.

Note that, in the following description, the term "apparatus" can be read as a circuit, a device, a unit, etc. The hardware configuration of each of the user equipment 100 and the base station 200 may be configured to include one or more of the respective devices illustrated, or may be configured not to include a part of the devices.

Each function of the user equipment 100 and the base station 200 is implemented by loading predetermined software (program) on hardware, such as the processor 1001 and the memory 1002, so that the processor 1001 performs computation and controls communication by the communication device 1004, and at least one of reading and writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, etc. For example, each of the above-described components may be implemented by the processor 1001.

Additionally, the processor 1001 reads a program (program code), a software module and data from at least one of the storage 1003 and the communication device 1004 to the memory 1002, and executes various processes according to these. As the program, a program is used which causes a computer to execute at least a part of the operations described in the above-described embodiments. For example, a process by each component of each of the user equipment 100 and the base station 200 may be implemented by a control program stored in the memory 1002 and executed by the processor 1001, and another functional block may be similarly implemented. Although it is described that the above-described various processes are executed by a single processor 1001, the above-described various processes may be simultaneously or sequentially executed by two or more processors 1001. The processor 1001 may be implemented with one or more chips. Note that the program may be transmitted from a network via an electric communication line.

The memory 1002 is a computer readable recording medium, and the memory 1002 may be formed of at least one of a read-only memory (ROM), an erasable programmable ROM (EPROM), an electrically erasable programmable ROM (EEPROM), a random access memory (RAM), etc. The memory 1002 may be referred to as a register, a cache, a main memory (main storage device), etc. The memory 1002 can store executable programs (program codes), software modules, etc., that can be executed to implement the radio communication method according to the embodiment of the present invention.

The storage 1003 is a computer readable recording medium, and, for example, the storage 1003 may be formed of at least one of an optical disk such as a CD-ROM (Compact Disc ROM), a hard disk drive, a flexible disk, a magneto-optical disk (for example, a compact disk, a digital versatile disk, a Blu-ray (registered trademark) disk), a smart card, a flash memory (for example, a card, a stick, a key drive), a floppy (registered trademark) disk, a magnetic strip, etc. The storage 1003 may be referred to as an auxiliary storage device. The above-described storage medium may be, for example, a database including the memory 1002 and/or the storage 1003, a server, or any other suitable medium.

The communication device 1004 is hardware (transmission/reception device) for performing communication between computers via a wired and/or wireless network, and, for example, the communication device 1004 is also referred to as a network device, a network controller, a network card, a communication module, etc. The communication device 1004 may be configured to include a high frequency switch, a duplexer, a filter, a frequency synthesizer, etc., to implement at least one of frequency division duplex (FDD: Frequency Division Duplex) and time division duplex (TDD: Time Division Duplex). For example, a transmission/reception antennal 101, an amplifier 102, a transceiver 103, a transmission line interface 106, etc., may be implemented by the communication device 1004. The transceiver 103 may be implemented such that a transmitter 103a and a receiver 103b are physically or logically separated.

The input device 1005 is an input device (e.g., a keyboard, a mouse, a microphone, a switch, a button, a sensor, etc.) for receiving an input from outside. The output device 1006 is an output device (e.g., display, speaker, LED lamp, etc.) that performs output toward outside. Note that the input device 1005 and the output device 1006 may be integrated (for example, a touch panel).

Furthermore, the devices, such as the processor 1001 and the memory 1002, are connected by a bus 1007 for communicating information. The bus 1007 may be formed of a single bus, or the bus 1007 may be formed of buses that are different among the devices.

Furthermore, each of the user equipment 100 and the base station 200 may be configured to include hardware, such as a microprocessor, a digital signal processor (DSP: Digital Signal Processor), an ASIC (Application Specific Integrated Circuit), a PLD (Programmable Logic Device), an FPGA (Field Programmable Gate Array), etc., and a part or all of the functional blocks may be implemented by the hardware. For example, the processor 101 may be implemented with at least one of these hardware components.

Notification of information is not limited the aspect/embodiment described in the present specification and may be performed by other methods. For example, notification of information may be performed via physical layer signaling (for example, Downlink Control Information (DCI) or Uplink Control Information (UCI)), higher-layer signaling (for example, RRC signaling, MAC signaling, broadcast information (Master Information Block (MIB), or System Information Block (SIB)), other signals, or by a combination thereof. Moreover, RRC signaling may be referred to as an RRC message, and, for example, the RRC message may be an RRC connection setup (RRC Connection Setup) message, an RRC connection reconfiguration (RRC Connection Reconfiguration) message, or the like, for example.

Each aspect/embodiment described in this specification can be applied to long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), any other systems using an appropriate system and/or next generation systems extended on the basis of these systems.

In processing procedures, sequences, flowcharts, etc., of each embodiment/modified example described in the specification, the order may be changed provided that there is no contradiction. For example, for the methods described in the specification, the elements of the various steps are presented in an exemplary order and are not limited to a specific order presented.

The specific operations that are described in the specification to be performed by the base station 200 may be performed by their upper nodes in some cases. In a network formed of one or more network nodes including a base station, it is apparent that the various operations performed for communication with the terminal may be performed by the base station and/or a network node other than the base station (e.g., MME or S-GW can be considered, however, not limited to these). In the above description, a case is exemplified in which there is one network node other than the base station. However, it can be a combination of other network nodes (e.g., MME and S-GW).

Information, etc., may be output from a higher layer (or a lower layer) to a lower layer (a higher layer). Input and output may be performed through a plurality of network nodes.

Input and output Information, etc., may be stored in a specific location (for example, a memory) and may be managed by a management table. The input and output information and the like may be overwritten, updated, or rewritten. The output information and the like may be erased. The input information and the like may be transmitted to other apparatuses.

Determination may be made by a value (0 or 1) represented by one bit, may be made by a Boolean value (Boolean: true or false), or may be made by comparison of numerical values (comparison with a predetermined value, for example).

Each aspect/embodiment described in this specification may be used alone, may be used in combination, or may be used while being switched during the execution. Furthermore, notification of predetermined information (e.g., notification of "being X") is not limited to notification that is made explicitly, and the notification may be made implicitly (e.g., notification of the predetermined information is not performed).

The present invention is described in detail above. It is apparent to a person ordinarily skilled in the art that the present invention is not limited to the embodiments described in the specification. The present invention can be implemented as modifications and alterations without departing from the gist and scope of the present invention that are determined by the descriptions of the claims. Accordingly, the descriptions of the present specification are for the purpose of illustration and does not have any restrictive meaning to the present invention.

The software should be widely interpreted to mean an instruction, an instruction set, a code, a code segment, a program code, a program, a subprogram, a software module, an application, a software application, a software package, a routine, a subroutine, an object, an executable file, an execution thread, a procedure, a function, etc., regardless of whether the software is referred to as software, firmware, middleware, microcode, hardware description language or other names.

Furthermore, software, instructions, etc., may be transmitted and received via a transmission medium. For example, when the software is transmitted from a website, server, or another remote source using at least one of wired technology (e.g., coaxial cable, fiber optic cable, twisted pair and digital subscriber line (DSL)) and wireless technology (infrared, radio, microwave, etc.), at least one of these wired and wireless technologies is included within the definition of the transmission medium.

Information, signals, etc., described in the present disclosure may be represented using any of various other techniques. For example, data, instructions, commands, information, signals, bits, symbols, chips, and the like mentioned in the entire description may be represented by voltage, current, electromagnetic waves, magnetic field or magnetic particles, optical field or photons, or any combination thereof.

Note that the terms described in this disclosure and the terms necessary for understanding of this specification may be replaced with terms having the same or similar meaning. For example, at least one of a channel and a symbol may be signal (signaling). Furthermore, a signal may be a message. Furthermore, a component carrier (CC) may be referred to as a carrier frequency, a cell, etc.

The terms "system" and "network" as used in this disclosure are used interchangeably.

Furthermore, the information, parameters, etc., described in this specification may be represented by absolute values, may be represented as relative values from predetermined values, or may be represented by any other corresponding information. For example, the radio resource may be indicated by an index.

The names used for the above-described parameters are not for limiting in any point. Furthermore, mathematical expressions, etc., using these parameters may be different from those explicitly disclosed in this specification. Since the various channels (e.g., PUCCH, PDCCH, etc.) and information elements (e.g., TPC etc.) can be identified by suitable names, the various names assigned to these various channels and information elements are not for limiting in any point.

In the present disclosure, it is assumed that "BS (Base Station)," "Radio Base Station," "Fixed Station," "Node B," "eNode B (eNB)," "gNode B (gNB)," "access point," "transmission point," "reception point," "transmission/reception point," "cell," "sector," "cell group," "carrier," "component carrier," etc., can be used interchangeably. A base station may also be referred to by a term, such as a macro cell, a small cell, a femtocell, and a pico-cell.

A base station can accommodate one or more (e.g., three) cells (also referred to as sectors). When the base station accommodates a plurality of cells, the entire coverage area of the base station can be divided into a plurality of smaller areas, and each smaller area may also provide communication services by base station subsystem (e.g., indoor small base station RRH: Remote Radio Head). The term "cell" or "sector" refers to a part or all of the coverage area of a base station and/or base station subsystem that provides communication service in this coverage. Furthermore, the terms "base station," "eNB," "cell," and "sector" may be used interchangeably in this specification. The base station may also be referred to as a fixed station, a NodeB, eNodeB (eNB), an access point, a femtocell, a small cell, etc.

In the present disclosure, the terms, such as "mobile station (MS)," "user terminal," "user equipment (UE)," "terminal", etc., can be used interchangeably.

A mobile station may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber stations, an access terminal, a mobile terminal, a wireless terminal, a remote terminal, a handset, a user agent, a mobile client, a client, or it may also be called by some other suitable terms.

At least one of the base station and the mobile station may be referred to as a transmitter, a receiver, a communication device, etc. At least one of the base station and the mobile station may be a device mounted on a mobile body, the mobile body itself, etc. The mobile body may be a vehicle (e.g., a car, an airplane, etc.), an unmanned mobile body (e.g., a drone, an automatically driven vehicle, etc.) or a robot (a manned type or an unmanned type). At least one of the base station and the mobile station also includes a device that does not necessarily move during a communication operation. For example, at least one of the base station and the mobile station may be an IoT (Internet of Things) device, such as a sensor.

The base station in the present disclosure may be replaced with a user terminal. For example, each aspect/embodiment of the present disclosure may be applied to a configuration obtained by replacing communication between a base station and a user terminal with communication between a plurality of user terminals (which may be referred to as D2D (Device-to-Device), V2X (Vehicle-to-Everything), etc. for example). In this case, the user terminal 20 may be provided with the functions of the above-described base station 10. Additionally, terms, such as "uplink" and "downlink," may be replaced with terms corresponding to inter-terminal communication (e.g., "side"). For example, an uplink channel, a downlink channel, etc., may be replaced with side channels.

Similarly, the user terminal in the present disclosure may be replaced with the base station. In this case, the configuration may be such that the base station 10 is provided with the functions of the user terminal 20.

The terms "determine (determining)" and "decide (determining)" used in this specification may include various types of operations. For example, "determining" and "deciding" may include deeming that a result of calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The terms "connected," "coupled," or any variation thereof mean any direct or indirect connection or coupling between two or more elements, and may include the presence of one or more intermediate elements between the two elements "connected" or "coupled" to each other. The coupling or connection between the elements may be physical, logical or a combination thereof. Two elements, when used in this specification, can be considered to be mutually "connected" or "coupled by using one more more wires, cables and/or printed electrical connections, and, as some non-limiting and non-inclusive examples, by using electromagnetic energy such as electromagnetic energy with a wavelength in a radio frequency range, a microwave range, and an optical range (both visible and invisible).

The reference signal may be abbreviated as RS (Reference Signal), and may be referred to as a pilot (Pilot) according to applicable standards.

The expression "on the basis of" used in the present specification does not mean "on the basis of only" unless otherwise stated particularly. In other words, the expression "on the basis of" means both "on the basis of only" and "on the basis of at least."

Any reference to elements using names, such as "first" and "second," as used in this specification does not generally limit the amount or order of those elements. These names can be used in this specification as a convenient way to distinguish between two or more elements. Accordingly, the reference to the first and second elements does not imply that only two elements can be adopted, or that the first element must precede the second element in some way.

"Means" in the configuration of each of the above-described devices may be replaced with "part," "circuit," "device," etc.

As long as "include," "including," and variations thereof are used in this specification or the claims, the terms are intended to be inclusive in a manner similar to the term "comprising." Furthermore, the term "or" used in the specification or claims is intended not to be an exclusive OR.

A radio frame may be formed of one or more frames in the time domain. In the time domain, each of the one or more of frames may be referred to as a subframe. A subframe may be formed of one or more slots in the time domain. A slot may be formed of one or more symbols (OFDM symbols, SC-FDMA symbols, etc.) in the time domain. Each of the radio frame, subframe, slot, and symbol represents a time unit for transmitting a signal. The radio frame, subframe, slot, and symbol may be called by respective different names. For example, in LTE system, the base station performs scheduling to allocate radio resources (a frequency bandwidth, transmission power, etc., that can be used by each mobile station) to each mobile station. The minimum time unit of scheduling may be referred to as TTI (Transmission Time Interval). For example, one subframe may be referred to as TTI, a plurality of consecutive subframes may be referred to as TTI, or one slot may be referred to as TTI. A resource block (RB) is a resource allocation unit in the time domain and the frequency domain, and may include one or more consecutive subcarriers in the frequency domain. Additionally, the resource block may include one or more symbols in the time domain, and may have a length of one slot, one subframe, or one TTI. Each of one TTI and one subframe may be formed of one or more resource blocks. The above-described configuration of the radio frame is merely an example, and the number of subframes included in the radio frame, the number of slots included in the subframe, the number of symbols and resource blocks included in the slot, and the number of subcarriers included in the resource block can be variously changed.

In the present disclosure, if an article is added by translation, such as "a," "an," and "the" in English, the disclosure may include that the noun following the article is plural.

The embodiments of the invention are described above in detail. However, the invention is not limited to the above-described specific embodiments, and various modifications and changes may be made within a range of the gist of the present invention described in the claims.

LIST OF REFERENCE SYMBOLS

10 radio communication system
100 user equipment
200 base station

The invention claimed is:

1. A terminal comprising:
   a processor that includes, in capability information, a separation class indicating a frequency separation between a lower edge of a component carrier with a lowest frequency for supported intra-band non-contiguous carrier aggregation and an upper edge of a component carrier with a highest frequency for the supported intra-band non-contiguous carrier aggregation; and
   a transmitter that transmits the capability information to a base station,
   wherein the separation class is indicated by an index to identify a class of the frequency separation.

2. The terminal according to claim 1, wherein the processor includes a combination of the component carriers for the intra-band non-contiguous carrier aggregation in the capability information.

3. The terminal according to claim 2, wherein the capability information includes a MIMO layer number.

4. A transmission method by a terminal, the method comprising:
   including, in capability information, a separation class indicating a frequency separation between a lower edge of a component carrier with a lowest frequency for supported intra-band non-contiguous carrier aggregation and an upper edge of a component carrier with a highest frequency for the supported intra-band non-contiguous carrier aggregation; and
   transmitting the capability information to a base station,
   wherein the separation class is indicated by an index to identify a class of the frequency separation.

5. A radio communication system comprising:
   a terminal; and
   a base station,
   wherein the terminal includes
      a processor that includes, in capability information, a separation class indicating a frequency separation between a lower edge of a component carrier with a lowest frequency for supported intra-band non-contiguous carrier aggregation and an upper edge of a component carrier with a highest frequency for the supported intra-band non-contiguous carrier aggregation; and a transmitter that transmits the capability information to the base station, wherein the separation class is indicated by an index to identify a class of the frequency separation, and wherein the base station includes a receiver that receives the capability information.

* * * * *